US011710243B2

(12) United States Patent
Zhang et al.

(10) Patent No.: US 11,710,243 B2
(45) Date of Patent: Jul. 25, 2023

(54) METHOD FOR PREDICTING DIRECTION OF MOVEMENT OF TARGET OBJECT, VEHICLE CONTROL METHOD, AND DEVICE

(71) Applicants: SENSETIME GROUP LIMITED, Hong Kong (CN); HONDA MOTOR CO. LTD., Tokyo (JP)

(72) Inventors: Shu Zhang, Hong Kong (CN); Zhaohui Yang, Hong Kong (CN); Jiaman Li, Hong Kong (CN); Xingyu Zeng, Hong Kong (CN)

(73) Assignees: SENSETIME GROUP LIMITED, Hong Kong (CN); HONDA MOTOR CO. LTD., Tokyo (JP)

( * ) Notice: Subject to any disclaimer, the term of this patent is extended or adjusted under 35 U.S.C. 154(b) by 344 days.

(21) Appl. No.: 17/025,313

(22) Filed: Sep. 18, 2020

(65) Prior Publication Data
US 2021/0001885 A1 Jan. 7, 2021

Related U.S. Application Data

(63) Continuation of application No. PCT/CN2019/078886, filed on Mar. 20, 2019.

(30) Foreign Application Priority Data

Mar. 23, 2018 (CN) .......................... 201810247961.0

(51) Int. Cl.
*G06T 7/20* (2017.01)
*G06T 7/70* (2017.01)
(Continued)

(52) U.S. Cl.
CPC ............... *G06T 7/20* (2013.01); *B60W 30/09* (2013.01); *B60W 30/0956* (2013.01);
(Continued)

(58) Field of Classification Search
CPC ............. B60W 60/0015; B60W 30/09; B60W 30/0956; B60W 50/14; B60W 2420/42;
(Continued)

(56) References Cited

U.S. PATENT DOCUMENTS

2015/0131861 A1* 5/2015 Feris ....................... G06T 7/246
382/103
2016/0292533 A1* 10/2016 Uchiyama ................. G06T 7/55
(Continued)

FOREIGN PATENT DOCUMENTS

| CN | 105242270 A | 1/2016 |
| CN | 107122736 A | 9/2017 |

(Continued)

OTHER PUBLICATIONS

Moriwaki, Katsumi. "Recognition of moving objects by image processing and its applications to a guide robot." 2011 IEEE/SICE International Symposium on System Integration (SII). IEEE, 2011. (Year: 2011).*

(Continued)

*Primary Examiner* — Russell Frejd
*Assistant Examiner* — Ana D Thomas
(74) *Attorney, Agent, or Firm* — Cooper Legal Group, LLC

(57) ABSTRACT

A method for predicting a direction of movement of a target object, a method for training a neural network, a smart vehicle control method, a device, an electronic apparatus, a computer readable storage medium, and a computer program. The method for predicting a direction of movement of a target object comprises: acquiring an apparent orientation of a target object in an image captured by a camera device, and acquiring a relative position relationship of the target object in the image and the camera device in three-dimensional space (S100); and determining, according to the (Continued)

apparent orientation of the target object and the relative position relationship, a direction of movement of the target object relative to a traveling direction of the camera device (S110).

18 Claims, 15 Drawing Sheets

(51) Int. Cl.
| | |
|---|---|
| *B60W 60/00* | (2020.01) |
| *B60W 30/09* | (2012.01) |
| *B60W 30/095* | (2012.01) |
| *B60W 50/14* | (2020.01) |
| *G08G 1/16* | (2006.01) |
| *G06V 10/764* | (2022.01) |
| *G06V 10/82* | (2022.01) |
| *G06V 20/58* | (2022.01) |
| *G06V 40/10* | (2022.01) |
| *G06T 7/11* | (2017.01) |

(52) U.S. Cl.
CPC ........ *B60W 50/14* (2013.01); *B60W 60/0015* (2020.02); *G06T 7/11* (2017.01); *G06T 7/70* (2017.01); *G06V 10/764* (2022.01); *G06V 10/82* (2022.01); *G06V 20/58* (2022.01); *G06V 40/103* (2022.01); *G08G 1/166* (2013.01); *B60W 2420/42* (2013.01); *B60W 2554/4029* (2020.02); *B60W 2554/80* (2020.02); *G06T 2207/10016* (2013.01); *G06T 2207/20081* (2013.01); *G06T 2207/20084* (2013.01); *G06T 2207/30196* (2013.01); *G06T 2207/30244* (2013.01); *G06T 2207/30256* (2013.01); *G06T 2207/30261* (2013.01)

(58) Field of Classification Search
CPC ...... B60W 2554/4029; B60W 2554/80; G06T 7/11; G06T 7/20; G06T 7/70; G06T 2207/10016; G06T 2207/20081; G06T 2207/20084; G06T 2207/30196; G06T 2207/30244; G06T 2207/30256; G06T 2207/30261; G06T 2207/30252; G08G 1/166; G06V 10/82; G06V 20/58; G06V 40/103; G06V 20/56; G06K 9/6267; G06K 9/6232; G06K 9/6256
See application file for complete search history.

(56) References Cited

U.S. PATENT DOCUMENTS

| | | | |
|---|---|---|---|
| 2017/0327112 A1* | 11/2017 | Yokoyama | ........ B60W 30/0956 |
| 2017/0330333 A1* | 11/2017 | Lin | .......................... G06T 7/246 |
| 2017/0352275 A1* | 12/2017 | Maruyama | ................ G06T 7/70 |
| 2018/0005054 A1 | 1/2018 | Yu et al. | |
| 2018/0012085 A1* | 1/2018 | Blayvas | .............. G06F 18/2414 |

FOREIGN PATENT DOCUMENTS

| | | |
|---|---|---|
| CN | 107194938 A | 9/2017 |
| CN | 107563256 A | 1/2018 |
| CN | 107609486 A | 1/2018 |
| CN | 107767419 A | 3/2018 |
| CN | 108416321 A | 8/2018 |
| JP | 2006202047 A | 8/2006 |
| JP | 4561346 B2 | 10/2010 |
| JP | 2014059841 A | 4/2014 |

OTHER PUBLICATIONS

International Search Report in the international application No. PCT/CN2019/078886, dated May 30, 2019, 2 pgs.

English translation of the Written Opinion of the International Search Authority in the international application No. PCT/CN2019/078886, dated May 30, 2019, 7 pgs.

"3D Bounding Box Estimation Using Deep Learning and Geometry"; Apr. 2017; Arsalan Mousavian, Dragomir Anguelov, John Flynn and Jana Kosecka; IEEE Conference on Computer Vision and Pattern Recognition (CVPR), 10 pgs.

"A Calibration Method for External Camera Parameters Based on Two Parallel Lines of Highway"; Jul. 2016; Sun Yinghui; Electronic Sci. & Tech. vol. 29, No. 7, 4 pgs.

First Office Action of the Japanese application No. 2020-550616, dated Nov. 24, 2021, 6 pgs.

* cited by examiner

METHOD FOR PREDICTING DIRECTION OF MOVEMENT OF TARGET OBJECT, VEHICLE CONTROL METHOD, AND DEVICE

CROSS-REFERENCE TO RELATED APPLICATIONS

This application is a continuation of International Application No. PCT/CN2019/078886, filed on Mar. 20, 2019, which claims priority to Chinese patent application No. 201810247961.0, filed on Mar. 23, 2018. The disclosures of International Application No. PCT/CN2019/078886 and Chinese patent application No. 201810247961.0 are hereby incorporated by reference in their entireties.

BACKGROUND

Automatic driving/aided driving is an important subject in the technical field of computer vision.

Under the condition that a vehicle is in an automatic driving/aided driving state, how to control the vehicle more accurately to improve the driving safety of the vehicle as much as possible is a technical problem of concern.

SUMMARY

The disclosure relates to computer vision technologies, and particularly to a method for predicting a motion orientation of a target object, a device for predicting a motion orientation of a target object, an intelligent vehicle control method, an intelligent vehicle control device, a neural network training method, a neural network training device, an electronic device, a computer-readable storage medium and a computer program.

Implementations of the disclosure provide technical solutions for predicting a motion orientation of a target object, intelligently controlling a vehicle and training a neural network.

According one aspect of the implementations of the disclosure, a method for predicting a motion orientation of a target object is provided, which may include: an apparent orientation of a target object in an image shot by an imaging device is acquired, and a relative positional relationship between the target object in the image and the imaging device in a three-dimensional space is acquired; and a motion orientation of the target object relative to a traveling direction of the imaging device is determined according to the apparent orientation of the target object and the relative positional relationship.

According to another aspect of the implementations of the disclosure, a neural network training method is provided, which may include: an image feature of a sample image block including a human body is acquired; a human body outline key point prediction result of the human body is acquired by means of a first neural network to be trained according to the image feature; and supervised learning is performed on the first neural network to be trained by using, as guidance information, a difference between the human body outline key point prediction result and human body outline key point labeling information.

According another aspect of the implementations of the disclosure, an intelligent vehicle control method is provided, which may include: an apparent orientation of a target object in an image shot by an imaging device is acquired, and a relative positional relationship between the target object in the image and the imaging device in a three-dimensional space is acquired; a motion orientation of the target object relative to a traveling direction of the imaging device is determined according to the apparent orientation of the target object and the relative positional relationship; and an instruction for controlling a vehicle where the imaging device is located or early warning prompting information for the vehicle is generated according to the motion orientation of the target object relative to the traveling direction of the imaging device.

According another aspect of the implementations of the disclosure, a device for predicting a motion orientation of a target object is provided, which may include: a memory storing processor-executable instructions; and a processor arranged to execute the stored processor-executable instructions to perform operations of: acquiring an apparent orientation of a target object in an image shot by an imaging device and acquire a relative positional relationship between the target object in the image and the imaging device in a three-dimensional space; and determining a motion orientation of the target object relative to a traveling direction of the imaging device according to the apparent orientation of the target object and the relative positional relationship.

According to another aspect of the implementations of the disclosure, a neural network training device is provided, which may include: a memory storing processor-executable instructions; and a processor arranged to execute the stored processor-executable instructions to perform operations of: acquiring a sample image block including a target object; performing apparent orientation detection on the sample image block by means of a first neural network to be trained to obtain an apparent orientation of the target object in the sample image block; and performing supervised learning on the first neural network to be trained by using, as guidance information, a difference between the obtained apparent orientation of the target object and apparent orientation labeling information of the sample image block.

According another aspect of the implementations of the disclosure, an intelligent vehicle control device is provided, which may include: a memory storing processor-executable instructions; and a processor arranged to execute the stored processor-executable instructions to perform operations of: acquiring an apparent orientation of a target object in an image shot by an imaging device and acquire a relative positional relationship between the target object in the image and the imaging device in a three-dimensional space; determining a motion orientation of the target object relative to a traveling direction of the imaging device according to the apparent orientation of the target object and the relative positional relationship; and generating an instruction for controlling a body where the imaging device is located or early warning prompting information for the body according to the motion orientation of the target object relative to the traveling direction of the imaging device.

According to another aspect of the implementations of the disclosure, an electronic device is provided, which may include: a memory, configured to store a computer program; and a processor, configured to execute the computer program stored in the memory, the computer program being executed to implement the method of any implementation of the disclosure.

According to another aspect of the implementations of the disclosure, a non-transitory computer-readable storage medium is provided having stored thereon a computer program that, when executed by a processor, cause the processor to implement the method of any implementation of the disclosure.

According to another aspect of the implementations of the disclosure, a computer program is provided, which may include a computer instruction that, when executed in a processor of a device, cause the processor to implement the method of any implementation of the disclosure.

The technical solutions of the disclosure will further be described below through the drawings and the implementations in detail.

BRIEF DESCRIPTION OF THE DRAWINGS

The drawings forming a part of the specification describe the embodiments of the disclosure and, together with the descriptions, are adopted to explain the principle of the disclosure.

Referring to the drawings, the disclosure may be understood more clearly according to the following detailed descriptions.

Figure 1:
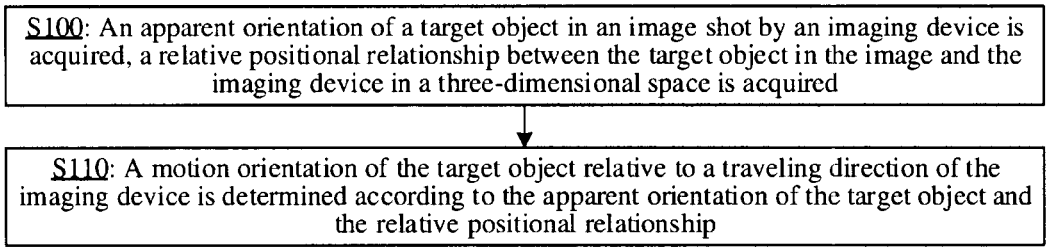

The drawings forming a part of the specification describe the implementations of the disclosure and, together with the descriptions, are adopted to explain the principle of the disclosure.

Referring to the drawings, the disclosure may be understood more clearly according to the following detailed descriptions.

FIG. 1 is a flowchart of a method for predicting a motion orientation of a target object according to an embodiment of the disclosure.

Figure 2:
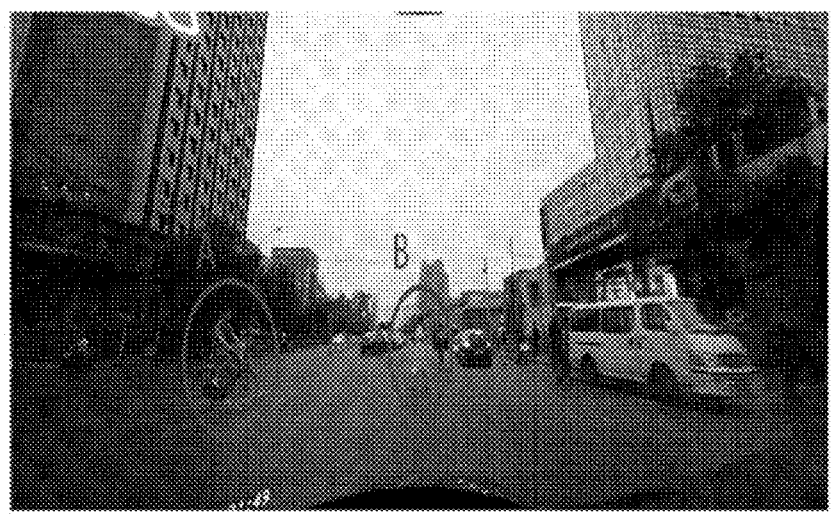

FIG. 2 is a schematic diagram of a target object A and target object B in an image according to an embodiment of the disclosure.

Figure 3:
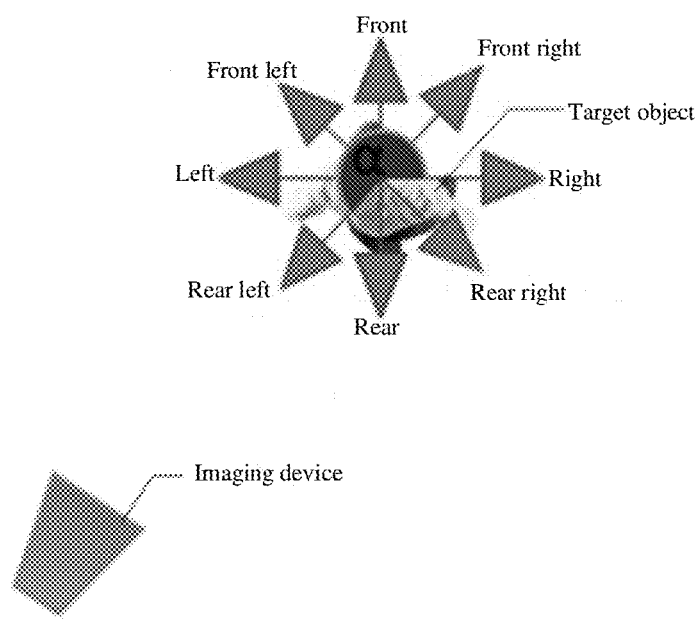

FIG. 3 is a schematic diagram of an implementation of an appearance orientation of a target object according to an embodiment of the disclosure.

Figure 4:
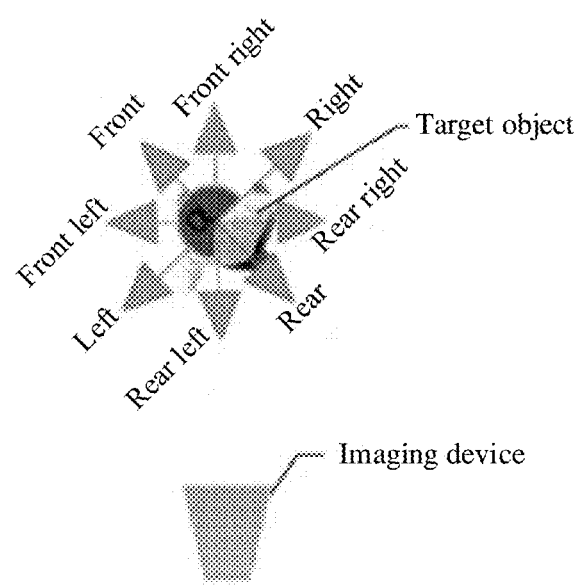

FIG. 4 is a schematic diagram of another implementation of an appearance orientation of a target object according to an embodiment of the disclosure.

Figure 5:
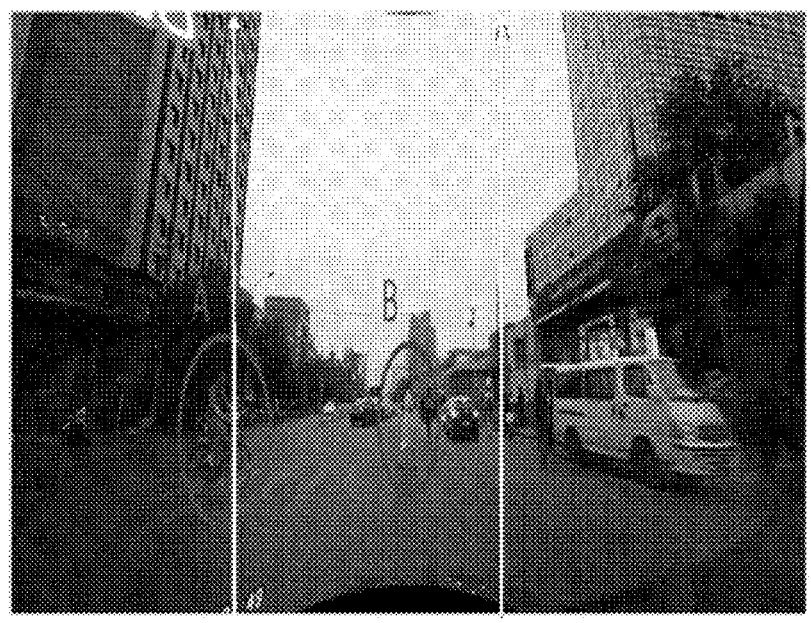

FIG. 5 is a schematic diagram of an implementation of two parallel lines in an image according to an embodiment of the disclosure.

Figure 6:
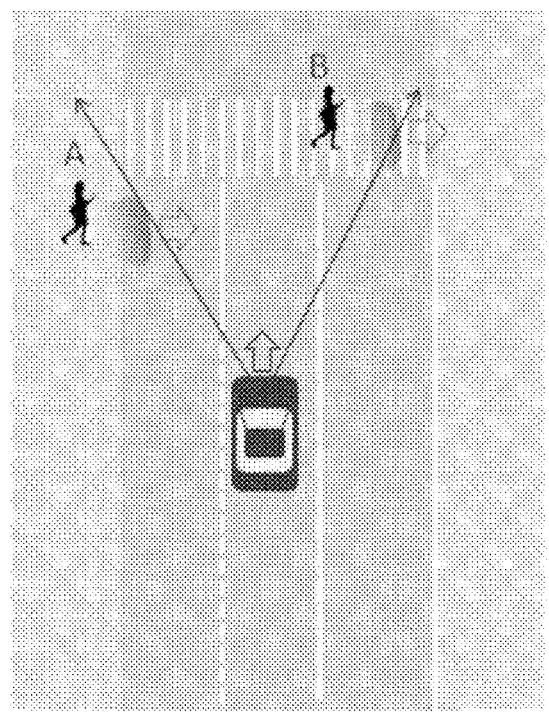

FIG. 6 is a schematic diagram of an implementation of forming two intersecting lines in a three-dimensional space by the two parallel lines in FIG. 5.

Figure 7:
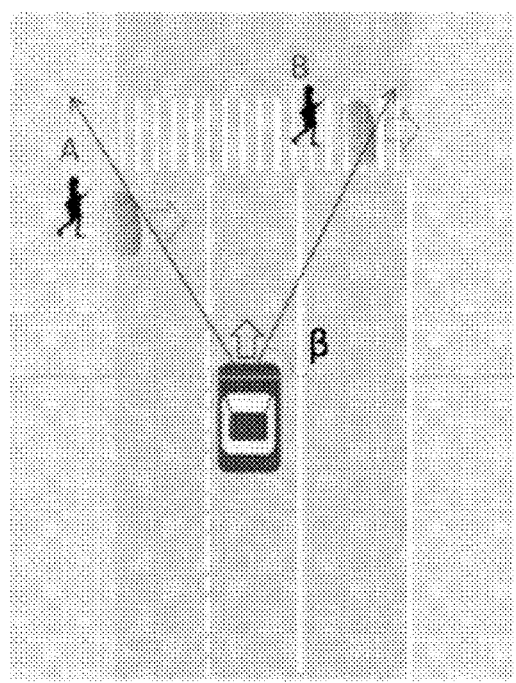

FIG. 7 is a schematic diagram of an implementation of a relative positional relationship between a target object and an imaging device according to an embodiment of the disclosure.

Figure 8:

FIG. 8 is a schematic diagram of an implementation of a motion orientation of a target object relative to a traveling direction of an imaging device according to an embodiment of the disclosure.

Figure 9:

FIG. 9 is a schematic diagram of another implementation of a motion orientation of a target object relative to a traveling direction of an imaging device according to an embodiment of the disclosure.

Figure 10:
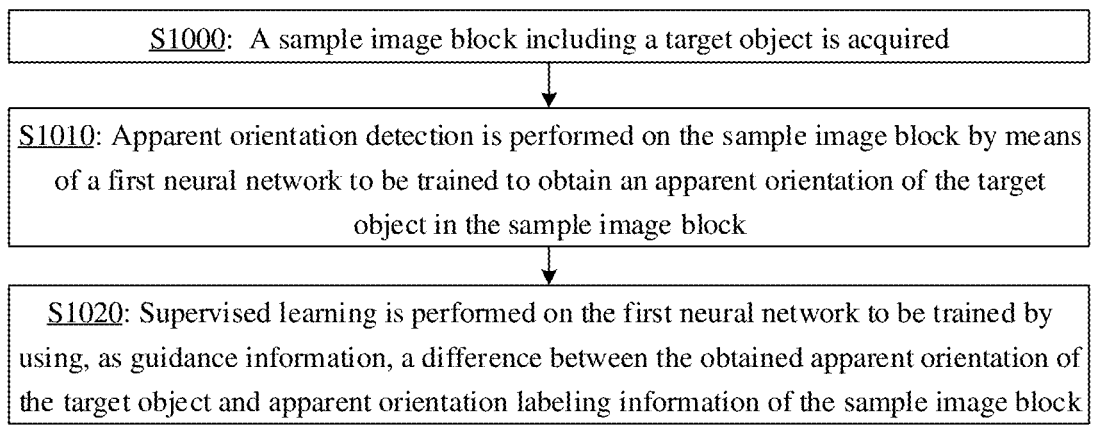

FIG. 10 is a flowchart of a neural network training method according to an embodiment of the disclosure.

Figure 11:
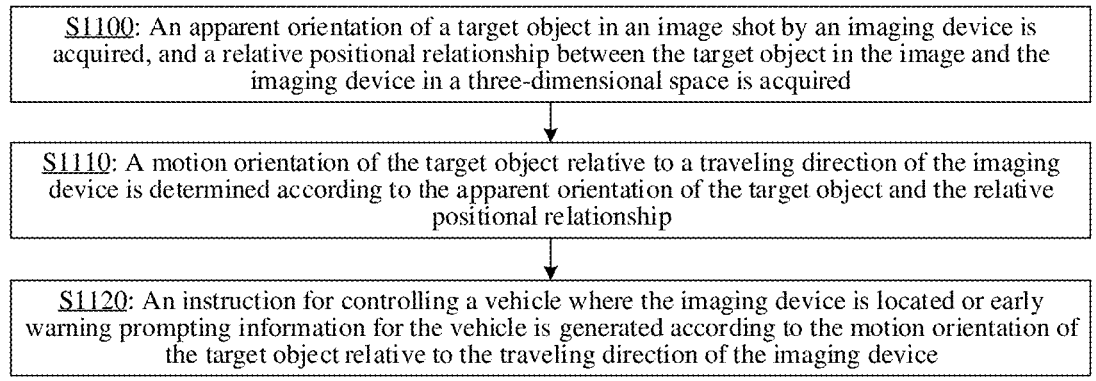

FIG. 11 is a flowchart of an intelligent vehicle control method according to an embodiment of the disclosure.

Figure 12:
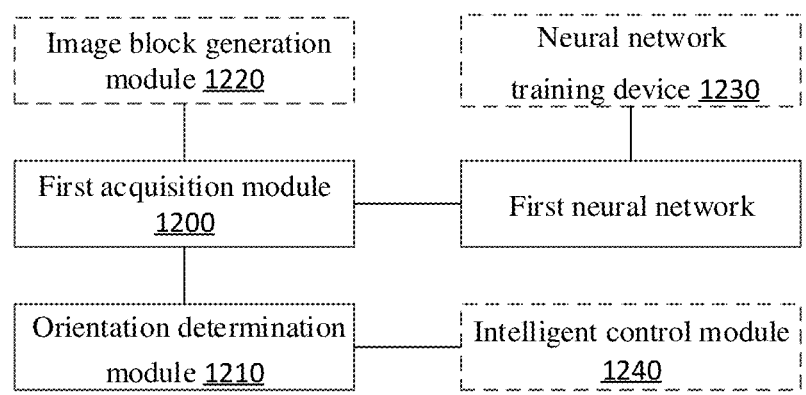

FIG. 12 is a structure diagram of a device for predicting a motion orientation of a target object according to an embodiment of the disclosure.

Figure 13:
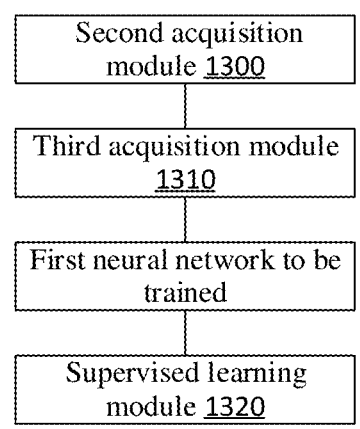

FIG. 13 is a structure diagram of a neural network training device according to an embodiment of the disclosure.

Figure 14:
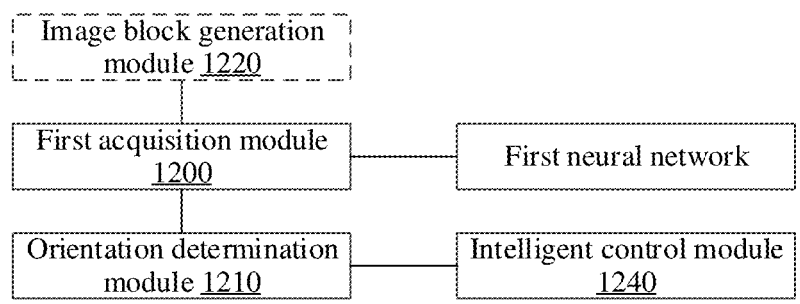

FIG. 14 is a structure diagram of an intelligent vehicle control device according to an embodiment of the disclosure.

Figure 15:
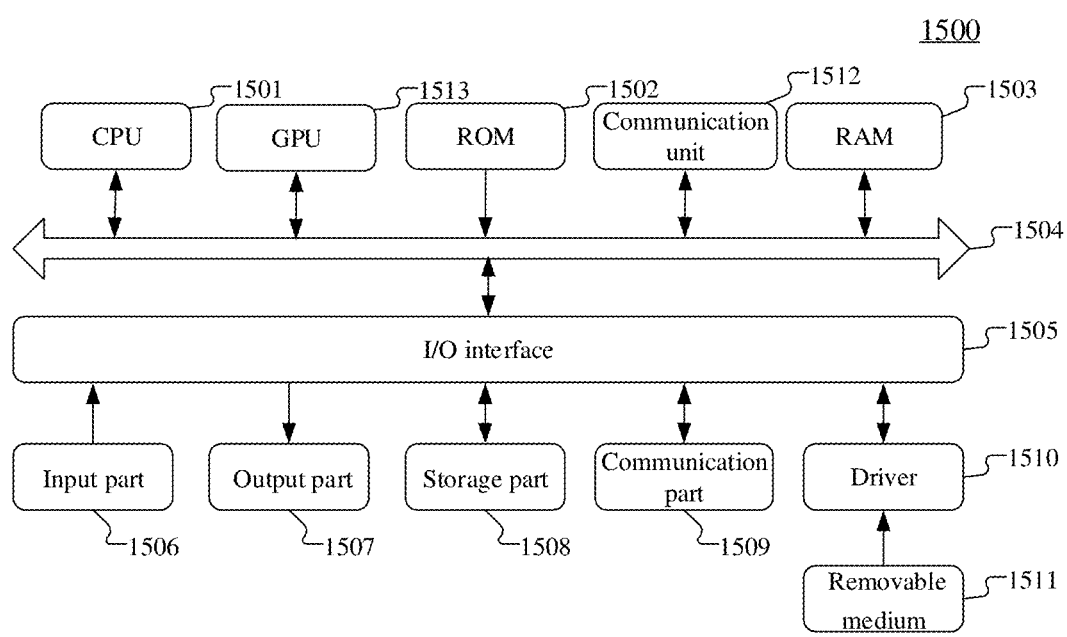

FIG. 15 is a block diagram of an exemplary device implementing an implementation of the disclosure.

DETAILED DESCRIPTION

Each exemplary embodiment of the disclosure will now be described with reference to the drawings in detail. It is to be noted that relative arrangement of components and operations, numeric expressions and numeric values elaborated in these embodiments do not limit the scope of the disclosure, unless otherwise specifically described.

In addition, it is to be understood that, for convenient description, the size of each part shown in the drawings is not drawn according to a practical proportional relationship.

The following descriptions of at least one exemplary embodiment are only illustrative in fact and not intended to form any limit to the disclosure and application or use thereof.

Technologies, methods and devices known to those of ordinary skill in the art may not be discussed in detail, but the technologies, the methods and the devices should be considered as a part of the specification as appropriate.

It is to be noted that similar reference signs and letters represent similar terms in the following drawings and thus a certain term, once defined in a drawing, is not required to be further discussed in subsequent drawings.

The embodiments of the disclosure may be applied to a computer system/server, which may be operated together with numerous other universal or dedicated computing system environments or configurations. Examples of well-known computing systems, environments and/or configurations suitable for use together with the computer system/server include, but not limited to, a Personal Computer (PC) system, a server computer system, a thin client, a thick client, a handheld or laptop device, a vehicle device, a microprocessor-based system, a set-top box, a programmable consumer electronic product, a network PC, a microcomputer system, a large computer system, a distributed cloud computing technical environment including any abovementioned system, and the like.

The computer system/server may be described in a general context of a computer system executable instruction (for example, a program module) executed by the computer system. Under a normal condition, the program module may include a routine, a program, a target program, a component, a logic, a data structure and the like, and they execute specific tasks or implement specific abstract data types. The computer system/server may be implemented in a distributed cloud computing environment, and in the distributed cloud computing environment, tasks are executed by a remote processing device connected through a communication network. In the distributed cloud computing environment, the program module may be in a storage medium of a local or remote computer system including a storage device.

FIG. 1 is a flowchart of a method for predicting a motion orientation of a target object according to an embodiment of the disclosure.

As shown in FIG. 1, the method of the embodiment includes the following operations.

In S100, an apparent orientation of a target object in an image shot by an imaging device is acquired, and a relative positional relationship between the target object in the image and the imaging device in a three-dimensional space is acquired.

In an optional example, S100 may be executed by a processor by invoking a corresponding instruction stored in a memory, and may also be executed by a first acquisition module 1200 operated by the processor.

In S110, a motion orientation of the target object relative to a traveling direction of the imaging device is determined according to the apparent orientation of the target object and the relative positional relationship.

In an optional example, S110 may be executed by the processor by invoking a corresponding instruction stored in the memory, and may also be executed by an orientation determination module 1210 operated by the processor.

According to the disclosure, the motion orientation of the target object relative to the traveling direction of the imaging device is determined by use of the apparent orientation of the target object and the relative positional relationship between the target object and the imaging device in the three-dimensional space, so that a present state of the target object in the image may be learned more clearly. For example, under the condition that different target objects in a same image have a same apparent orientation and relative positional relationships of the different target objects and the imaging device in the three-dimensional space are different, it may be judged in the disclosure that motion orientations of the different target objects with the same apparent orientation in the image relative to the traveling direction of the imaging device (for example, a traveling direction of a device such as a vehicle where the imaging device is located) are different. For another example, under the condition that apparent orientations of the same target object in different images have changed and relative positional relationships of the target object and the imaging device in the three-dimensional space change, it may be judged in the disclosure that motion orientations of the same target object with the different apparent orientations in the different images relative to the traveling direction of the imaging device (for example, the traveling direction of the vehicle where the imaging device is located) are the same. It can thus be seen that the technical solution provided in the disclosure is favorable for improving the accuracy in interpretation of the image. When applied to an application such as automatic driving or aided driving, the technical solution provided in the disclosure is favorable for accurately understanding a motion orientation of a target object such as a pedestrian relative to a driving direction of a vehicle, favorable for accurately generating an instruction for controlling the vehicle or early warning prompting information for the vehicle, and thus favorable for improving the driving safety of the vehicle.

In an optional example, the imaging device in the disclosure may be an imaging device arranged in a body, and the body is usually movable. For example, the body may be a vehicle, an aircraft, a ship or a robot. A specific representation form of the body is not limited in the disclosure. In addition, in the following descriptions about the technical solution, the technical solution of the disclosure may be described sometimes with a vehicle as an example, but this does not mean that the body in the disclosure is required to be a vehicle. Under the condition that the imaging device in the disclosure is an imaging device arranged in a vehicle, the imaging device may be a camera in an automobile data recorder, or a camera arranged in a cab of the vehicle or another element with an imaging function. Of course, the imaging device in the disclosure may also be an imaging device arranged in another object such as a navigation device for the blind.

In an optional example, the image in the disclosure may be a video frame extracted from a video shot by the imaging device in a frame extraction manner. Of course, the image may also be any video frame in the video shot by the imaging device or a photo shot by the imaging device, etc.

In an optional example, the target object in the disclosure may be preset according to a practical requirement. For example, the target object may include, but not limited to, a body of which a motion orientation requires attentions such as a pedestrian, an animal, a non-motor vehicle and an obstacle. In addition, in the following descriptions about the technical solution, the technical solution of the disclosure may be described sometimes with a pedestrian as an example, but this does not mean that the target object in the disclosure is required to be a pedestrian. A specific representation form of the target object is not limited in the disclosure.

In an optional example, the apparent orientation of the target object in the disclosure usually refers to an orientation, presented by observable information of an appearance of the target object in the image, of the target object, for example, under the condition that the target object is a pedestrian, it is an orientation, presented by observable information of an appearance (such as eyes or nose) of the pedestrian in the image, of the pedestrian. If being the front, the apparent orientation is usually a direction facing the target object. If being the rear, the apparent orientation is usually a direction opposite to the target object. If being the right, the apparent orientation is usually a direction facing a right side of the target object. If being the left, the apparent orientation is usually a direction facing a left side of the target object. In the image shown in FIG. 2, respective apparent orientations presented by appearances of a target object A (i.e., a pedestrian A) and a target object B (a pedestrian B) are both the right.

In an optional example, the apparent orientation, that may be presented in the image, of the target object is usually related to the present state of the target object and a shooting direction of the imaging device. For example, if the shooting direction of the imaging device changes, the apparent orientation of the target object that is kept unchanged at the same physical position may change. For another example, if the target object at the same position rotates and the shooting direction of the imaging device does not change, the apparent orientation of the target object will change.

In an optional example, the operation that the apparent orientation of the target object in the image shot by the imaging device is acquired includes the following operation.

An image block including the target object in the image is provided to a first neural network for performing apparent orientation detection to obtain the apparent orientation of the target object in the image.

According to the disclosure, the apparent orientation of the target object in the image shot by the imaging device may be acquired by use of the first neural network. For example, the image block including the target object in the image is provided to the first neural network for performing apparent orientation detection (for example, classification processing or regression processing), so that the apparent orientation of the target object in the image may be obtained according to information output by the first neural network. Of course, the whole image may also be provided to the first neural network for performing apparent orientation detection in the disclosure. The first neural network in the disclosure is trained with a training image set in advance. The training image set includes multiple image samples and apparent orientation labeling information of the image samples. A training process of the first neural network may refer to the following descriptions about FIG. 10. The apparent orientation of the target object is obtained by use of the first neural network, so that the disclosure is favorable for rapidly obtaining the apparent orientation and favorable for improving the accuracy of the apparent orientation.

In addition, a size of the image block provided for the first neural network is usually related to a requirement of the first neural network on a size of an input image. For example, the first neural network requires that the size of the input image block may be 256×256. In the disclosure, scaling, stretching and compression processing, etc., may be performed on the image or the image block obtained by segmentation to ensure that the image block obtained by segmentation meets the requirement of the first neural network. The size of the image block provided for the first neural network is not limited in the disclosure.

In an optional example, a network structure of the first neural network in the disclosure may be flexibly designed according to a practical requirement of classification (for example, quaternary classification or octonary classification or division into more classes) of the apparent orientation, and a specific network structure of the first neural network is not limited in the embodiment of the disclosure. For example, the first neural network in the disclosure may include, but not limited to, a convolutional layer, a Rectified Linear Unit (ReLU) layer, a pooling layer and a fully connected layer, etc. If the number of layers in the first neural network is larger, the network is deeper. For example, the network structure of the neural network in the disclosure may adopt, but not limited to, network structures adopted for neural networks such as ALexNet, a deep Residual Network (ResNet) and Visual Geometry Group Network (VGGnet).

In an optional example, the image block is generated by the following manners.

The image is provided to a second neural network configured for target object bounding box detection to obtain a bounding box of the target object in the image.

Segmentation processing is performed on the image according to an obtained bounding box of the target object to obtain the image block including the target object.

In the disclosure, the image block including the target object in the image may be acquired by use of the second neural network configured for target object bounding box detection. For example, at first, the image is provided to the second neural network configured for target object bounding box detection, so that the bounding box (for example, coordinates of two vertexes on a diagonal of the bounding box) of the target object in the image may be obtained according to target object detection result information output by the second neural network in the disclosure. Then, segmentation processing is performed on the image by use of an obtained bounding box of the target object, so that the image block including the target object may be obtained. Under the condition that the image includes multiple target objects (for example, pedestrians), multiple bounding boxes of the target objects may be obtained by use of the second neural network configured for target object bounding box detection in the disclosure, so that multiple image blocks may be obtained by segmentation processing.

In an optional example, under the condition that the target object in the disclosure is a pedestrian, a human body detection result output by the second neural network for human body bounding box detection usually includes a central position of a human body bounding box in the image and a human body dimension factor. The central position of the human body bounding box in the disclosure may be referred to as a human body position or a human body center point, etc. The human body dimension factor in the disclosure may be configured to determine a size of the human body bounding box. The human body dimension factor may include a scaling factor. For example, the human body dimension factor s may be a scaling factor for scaling a size H of the head in the image to a standard size h, that is, s=h/H. Then, in the disclosure, scaling processing may be performed on the image by use of the central position of the human body bounding box and the human body dimension factor, and cropping processing is performed on the image subjected to scaling processing according to the requirement of the first neural network on the size of the image block and the central position, so that the image block meeting the requirement of the first neural network on the size of the image block and including a human body may be obtained.

In an optional example, the second neural network configured for target object bounding box detection in the disclosure may be implemented by a conventional Histogram of Oriented Gradient (HOG) operator-based cascade detector, a deep-learning-based Regions with Convolutional Neural Network (RCNN), FastRCNN, FasterRCNN, a Single Shot MultiBox Detector (SSD), a You Only Look Once (YOLO) algorithm and the like. A specific structure of the second neural network configured for target object bounding box detection, a manner for forming the bounding box of the target object by use of the second neural network and the like are not limited in the disclosure.

The bounding box of the target object is acquired by use of the second neural network, so that the disclosure is favorable for rapidly and comprehensively obtaining the bounding box of the target object and favorable for improving the accuracy of the bounding box of the target object.

In an optional example, the target object in the image block obtained in the disclosure may be a complete target object and may also be a partial target object. For example, under the condition that the target object is a pedestrian, the target object in the image block may be a complete human body and may also be a partial human body (i.e., a part of the human body, for example, a half-length portrait of the human body). A specific representation form of the target object in the image block is not limited in the disclosure.

According to some implementations, the first neural network is trained with a training image set including labeling information of the apparent orientation of the target object in advance.

In the embodiment of the disclosure, the training image set includes multiple image samples and apparent orientation labeling information of the image samples. The training process of the first neural network may refer to the following descriptions about FIG. 10. The apparent orientation of the target object is obtained by use of the first neural network, so that the disclosure is favorable for rapidly obtaining the apparent orientation and favorable for improving the accuracy of the apparent orientation.

According to some implementations, the training process of the first neural network includes the following operations.

A sample image block including the target object is acquired.

Apparent orientation detection is performed on the sample image block by means of the first neural network to be trained to obtain an apparent orientation of the target object in the sample image block.

Supervised learning is performed on the first neural network to be trained by using, as guidance information, a difference between the obtained apparent orientation of the target object and apparent orientation labeling information of the sample image block.

In an optional example, in the disclosure, the image sample may be acquired from a training dataset and the sample image block including the target object in the image sample may be acquired. For example, in the disclosure, the image sample may be provided for the successfully trained neural network configured for target object bounding box detection, and the neural network outputs target object detection result information. In the disclosure, a bounding box (for example, coordinates of two vertexes on a diagonal of the bounding box) of the target object in the image sample may be obtained according to the detection result information, and then segmentation processing may be performed on the image sample by use of an obtained bounding box of the target object, so that the sample image block including the target object may be obtained. Under the condition that the image sample includes multiple target objects (for example, pedestrians), multiple bounding boxes of the target objects may be obtained by use of the neural network configured for target object bounding box detection in the disclosure, so that multiple sample image blocks may be obtained by segmentation processing.

In an optional example, the apparent orientation labeling information includes, but not limited to, labeling information of an angle interval to which the apparent orientation belongs or labeling information of an apparent orientation angle.

The information output by the first neural network to be trained includes, but not limited to, information representing the angle interval to which the apparent orientation of the target object belongs or information representing an apparent orientation angle of the target object.

The information output by the first neural network in the embodiment of the disclosure may usually include the information representing the angle interval to which the apparent orientation of the target object belongs, for example, two angle end values of the angle interval to which the apparent orientation of the target object belongs, for another example, an identifier corresponding to the angle interval to which the apparent orientation of the target object belongs (for example, 1 represents one angle interval and 2 represents another angle interval).

In an optional example, the angle interval includes, but not limited to, at least one of:

a front angle interval, a front left angle interval, a left angle interval, a rear left angle interval, a rear angle interval, a rear right angle interval, a right angle interval and a front right angle interval.

According to some implementations, the apparent orientation of the target object usually belongs to an angle range of 0 degree to 360 degrees. The angle range may be divided into multiple angle intervals in the disclosure. For example, in the disclosure, the angle range of 0 degree to 360 degrees may be divided into four angle intervals, i.e., the front angle interval (315 degrees to 45 degrees), the left angle interval (315 degrees to 225 degrees), the rear angle interval (225 degrees to +135 degrees) and the right angle interval (+45 degrees to +135 degrees). In such case, the first neural network may be a quaternary classification processing-based first neural network. For another example, in the disclosure, the angle range of 0 degree to 360 degrees may be divided into eight angle intervals, i.e., the front angle interval (337.5 degrees to 22.5 degrees), the front left angle interval (337.5 degrees to 292.5 degrees), the left angle interval (292.5 degrees to 247.5 degrees), the rear left angle interval (247.5 degrees to 202.5 degrees), the rear angle interval (202.5 degrees to 157.5 degrees), the rear right angle interval (157.5 degrees to 112.5 degrees), the right angle interval (112.5 degrees to 67.5 degrees) and the front right angle interval (67.5 degrees to 22.5 degrees). In such case, the first neural network may be an octonary classification processing-based first neural network.

Of course, the angle range of 0 degree to 360 degrees may also be divided into more angle intervals in the disclosure. The number of the divided angle intervals is not limited in the disclosure. In addition, it is to be particularly noted that an angle end value shared by two adjacent angle intervals usually belong to the two angle intervals respectively.

According to some implementations, the information output by the first neural network in the embodiment of the disclosure may further include the information representing the apparent orientation angle of the target object, for example, the apparent orientation angle of the target object, for another example, an identifier corresponding to the apparent orientation angle of the target object. In such case, the first neural network may be a regression-processing-based first neural network.

In an optional example, any angle in the angle interval, output by the first neural network, to which the apparent orientation of the target object belongs is determined as the apparent orientation of the target object; or a center angle of the angle interval, output by the first neural network, to which the apparent orientation of the target object belongs is determined as the apparent orientation of the target object.

Under the condition that the first neural network in the embodiment of the disclosure outputs the angle interval to which the apparent orientation of the target object belongs for the input image block, the center angle of the angle interval, output by the first neural network, to which the apparent orientation of the target object belongs may usually be used as the apparent orientation of the target object in the disclosure. For example, a center angle 90 of the angle interval of 112.5 degrees to 67.5 degrees is determined as the apparent orientation of the target object. The center angle of the angle interval in the disclosure may also be referred to as an average angle, and the average angle is not an average value of the two end values of the angle interval but may be considered to be an average value of integral angles (for example, all integral angles) in the angle interval. Under the condition that 360 degrees are divided into the eight angle intervals, center angles of the eight angle intervals are 0 degree (i.e., 360 degrees) (the arrow pointing to the front in FIG. 3), 45 degrees (the arrow pointing to the front right in FIG. 3), 90 degrees (the arrow pointing to the right in FIG. 3), 135 degrees (the arrow pointing to the rear right in FIG. 3), 180 degrees (the arrow pointing to the rear in FIG. 3), 315 degrees (the arrow pointing to the front left in FIG. 3), 270 degrees (the arrow pointing to the left in FIGS. 3) and 225 degrees (the arrow pointing to the rear left in FIG. 3).

It is to be particularly noted that each direction shown in FIG. 3 is determined by a present shooting direction of the imaging device arranged in the vehicle (i.e., the traveling direction of the imaging device). In addition, any angle in the angle interval, output by the first neural network, to which the apparent orientation of the target object belongs may also be determined as the apparent orientation of the target object in the disclosure. A specific implementation manner for determining the apparent orientation of the target object according to the angle interval to which the apparent orientation of the target object belongs is not limited in the disclosure.

In an optional example, transformation processing may be performed on the obtained apparent orientation of the target object according to a practical requirement of subsequent determination of the motion orientation in the disclosure.

For example, the apparent orientation of the target object may be transformed to a counterclockwise included angle α between a shooting direction of the target object (for example, a line connecting a device shooting the target object and the target object, i.e., one side of the center angle of the angle interval output by the first neural network) and the right of the target object. For example, in FIG. 3, the imaging device is at the rear left of the target object (for example, the pedestrian), namely the imaging device shoots from the rear left of the target object, and the included angle α is a counterclockwise included angle between the rear left of the target object and the right of the target object. For another example, in FIG. 4, the imaging device is still at the rear left of the target object (for example, the pedestrian), namely the imaging device shoots from the rear left of the target object, and the included angle α is also the counterclockwise included angle between the rear left of the target object and the right of the target object. The apparent orientation of the target object may also be transformed in another transformation manner in the disclosure, thereby representing the apparent orientation of the target object. A specific representation manner of the apparent orientation of the target object is not limited in the disclosure.

In an optional example, both a position of the target object in the image and the imaging device may be transformed to the same three-dimensional space in the disclosure, so that the relative positional relationship between the target object in the image and the imaging device in the three-dimensional space may be obtained. Herein, when one (for example, the imaging device) of the target object and the imaging device is taken as a reference point, the relative positional relationship may be a bearing of the other (for example, the target object) relative to the reference point. The relative positional relationship in the disclosure may usually be represented by an included angle between the line connecting the target object and the imaging device in the three-dimensional space and a horizontal line or a vertical line (for example, y axis in the three-dimensional space). The three-dimensional space in the disclosure is usually a three-dimensional space in the real world, i.e., a three-dimensional space based on a world coordinate system. The origin of the world coordinate system may be at any position. A plane determined by the x axis and y axis of the world coordinate system may be considered as the horizon and may also be considered to be parallel to the horizon. A specific representation form of the three-dimensional space is not limited in the disclosure.

In an optional example, the position of the target object in the image and the imaging device may be transformed to the same three-dimensional space by use of a projection transformation matrix (which may also be referred to as a homography matrix) in the disclosure. In the disclosure, the position of the target object in the image and the imaging device may be rapidly and accurately transformed to the same three-dimensional space with the projection transformation matrix respectively.

In an optional example, the projection transformation matrix includes a projection transformation matrix formed by calibrating the imaging device in advance; or the projection transformation matrix includes a projection transformation matrix obtained by solving a homography matrix function according to coordinates, in the image, of multiple feature points in the image.

According to some implementations, the projection transformation matrix in the disclosure may be the projection transformation matrix obtained by performing calibration processing on the imaging device in advance. For example, calibration processing is performed on the imaging device by use of a preset calibration device such as a checkerboard, thereby obtaining the projection transformation matrix. In the disclosure, a function configured to obtain projection transformation matrices may also be solved according to the coordinates, in the image, of the feature points in the image, thereby the projection transformation matrix. The function configured to obtain projection transformation matrices may be a function provided by opencv for obtaining projection transformation matrices and the like. In the disclosure, a specific representation form of the function adopted for obtaining the projection transformation matrix and configured to obtain projection transformation matrices is not limited, and a specific implementation manner for obtaining the projection transformation matrix is also not limited.

In an optional example, the feature point may include, but not limited to, a point on a road planning marking. In the disclosure, the feature point in the image used for obtaining the projection transformation matrix is usually a point on a body (for example, the point on the road planning marking) complying with a standard specification in the image. According to some implementations, the feature point in the image may include a vertex on the road planning marking and the like. The road planning marking in the disclosure may include, but not limited to, a white solid line, a white dashed line, a zebra crossing, a single yellow solid line, a single yellow dashed line or double yellow solid lines, etc. In the disclosure, at least two vertexes (for example, two vertexes in width or two vertexes in a length direction) on each road planning marking in multiple road planning markings in the image are determined. Since the width, length and the like of the road planning marking are usually up to a certain standard specification, the practical width, practical length and the like of the road planning marking are known. Therefore, in the disclosure, the corresponding function may be solved by use of a certain number of feature points in the image, and the projection transformation matrix may be obtained from a solving result. Adopting the solution is favorable for improving the projection transformation accuracy and reducing the complexity.

In the disclosure, the projection transformation matrix is obtained by use of the road planning marking, so that a method easy to implement to obtain the projection transformation matrix is provided, the projection transformation matrix may be obtained dynamically anytime, and the phenomenon that the projection transformation matrix is required to be preset is favorably reduced.

In an optional example, S100 includes the following operations.

A position of the target object in the image is transformed to a position of the target object in the three-dimensional space according to the projection transformation matrix.

A position of the imaging device in the three-dimensional space is determined.

The positions of the target object and imaging device in the three-dimensional space are connected, and an included angle between a line connecting the positions and a normal of a motion orientation of the imaging device is determined.

In the embodiment of the disclosure, an example of transforming the position of the target object in the image to the three-dimensional space by use of the projection transformation matrix is as follows. A position of a point on a lower edge of the bounding box of the target object in the image is transformed to the three-dimensional space by use of the projection transformation matrix, the position of the point in the three-dimensional space being considered as the position of the target object in the three-dimensional space.

The point on the lower edge of the bounding box of the target object may usually adopt a midpoint on the lower edge. Since a position of the midpoint on the lower edge of the bounding box of the target object in the three-dimensional space is usually a position relatively close (for example, closest) to a vertical projection point of a center of gravity of the target object on the horizon in the three-dimensional space, determining a position of a relatively low (for example, lowest) midpoint of the bounding box of the target object in the three-dimensional position as the position of the target object in the three-dimensional space in the disclosure may ensure the accuracy of the position of the target object in the three-dimensional space as much as possible under the condition of reducing projection processing over the center of gravity of the target object in the image.

In an optional example, the operation that the position of the imaging device in the three-dimensional space is determined includes the following operations.

A first point and second point on a first line in the image and a third point and fourth point on a second line in the image are transformed to the three-dimensional space according to the projection transformation matrix respectively.

An intersection point of a line formed by the first point and the second point in the three-dimensional space and a line formed by the third point and the fourth point in the three-dimensional space is determined as the position of the imaging device in the three-dimensional space.

The first line and second line in the image are parallel to each other and perpendicular to a horizontal direction respectively.

In the disclosure, an example of determining the position of the imaging device in the three-dimensional space by use of the projection transformation matrix is as follows. Two parallel lines (for example, parallel straight lines or line segments) are set in the image, referred to as the first line and the second line hereinafter. The first line and the second line are perpendicular to the horizontal direction of the image respectively (two arrowed parallel lines in FIG. 5) Two points, for example, the first point and the second point (any two points on the first line), are selected from the first line, and two points, for example, the third point and the fourth point (any two points on the second line), are selected from the second line. The first point, the second point, the third point and the fourth point are transformed to the three-dimensional space by use of the projection transformation matrix respectively. The first point and second point in the three-dimensional space are connected to form a line, the third point and fourth point in the three-dimensional space are connected to form another line, the two lines may undoubtedly have an intersection point, and the intersection point is determined as the position of the imaging device in the three-dimensional space in the disclosure. The two arrowed parallel lines in FIG. 5 in the three-dimensional space become the two lines with the intersection point in FIG. 6. The abovementioned manner for determining the position of the imaging device in the three-dimensional space in the disclosure is favorable for rapidly and accurately obtaining the position of the imaging device in the three-dimensional space, and the manner is easy to implement.

In an optional example, the traveling direction of the imaging device in the disclosure includes a motion direction of the imaging device in a motion state and a direction of a motion trend of the imaging device in a stationary state. The traveling direction of the imaging device is usually the same as a traveling direction of the device where the imaging device is located. For example, for the imaging device arranged in the vehicle, the traveling direction of the imaging device is usually a driving direction of the vehicle; when the vehicle is in the motion state, a motion direction of the vehicle is the traveling direction of the imaging device; and when the vehicle is in the stationary state, a direction that the headstock of the vehicle points to is a direction of a motion trend of the vehicle, i.e., the direction of the motion trend of the imaging device.

In an optional example, the relative positional relationship between the target object in the image and the imaging device in the three-dimensional space includes a bearing of the target object in the three-dimensional space relative to the imaging device in the three-dimensional space.

In an optional example, S110 may include: the motion orientation of the target object relative to the traveling direction of the imaging device is determined according to the apparent orientation of the target object and a bearing of the target object in the three-dimensional space relative to the imaging device.

According to some implementations, the apparent orientation of the target object in the embodiment of the disclosure may be represented as the counterclockwise included angle (for example, the included angle $\alpha$ obtained in the abovementioned embodiment) between the shooting direction of the target object and the right of the target object.

According to some implementations, the bearing of the target object in the three-dimensional space relative to the imaging device in the three-dimensional space includes:

the included angle between the line connecting the position of the target object in the three-dimensional space and the position of the imaging device in the three-dimensional space and the normal of the motion orientation of the imaging device.

In an optional example, in the disclosure, after the position of the target object in the three-dimensional space and the position of the imaging device in the three-dimensional space are obtained, the target object and imaging device in the three-dimensional space may be connected, and the included angle (for example, the included angle $\beta$) between the line connecting them and the normal of the motion orientation of the imaging device may be determined as the relative positional relationship between the target object and the imaging device. The abovementioned manner for determining the relative positional relationship between the target object and the imaging device in the disclosure is favorable for rapidly and accurately obtaining the relative positional relationship between the target object and the imaging device, and the manner is easy to implement. Of course, the relative positional relationship between the target object and the imaging device may also be represented in another manner in the disclosure. A specific representation form of the relative positional relationship between the target object and the imaging device is not limited in the disclosure.

In an optional example, the motion orientation $\theta$ of the target object relative to the traveling direction of the imaging device may be obtained with formula (1):

$$\theta = \alpha + \beta + 360°/4 \qquad \text{Formula (1).}$$

$\alpha$ is the apparent orientation of the target object, may be represented as the counterclockwise included angle between the shooting direction of the target object and the right of the target object and takes degree as its unit. $\beta$ is the relative positional relationship between the target object and the imaging device in the three-dimensional space, may be represented as the included angle between the line connecting the position of the target object in the three-dimensional space and the position of the imaging device in the three-dimensional space and the normal of the motion orientation of the imaging device, and takes degree as its unit. With the formula (1), the angle θ of the motion orientation of the target object relative to the traveling direction of the imaging device may be calculated. For example, as shown in FIG. 7, for a pedestrian B, the obtained counterclockwise included angle α between the shooting direction of the target object and the right of the target object is 225 degrees, the relative positional relationship β of the target object and the imaging device in the three-dimensional space is 45 degrees, and α and β are substituted into the formula (1) to obtain θ=225°+45°+90°=360°. In such case, it is predicted that the pedestrian B walks to the right.

In an optional example, for two different target objects with the same apparent orientation, relative positional relationships of the two target objects and the imaging device are different, so that finally determined motion orientations of the target objects relative to the traveling direction of the imaging device may be different. For example, the pedestrian in FIG. 8 and the pedestrian in FIG. 9 have the same apparent orientation, namely the right, but a relative positional relationship between the pedestrian in FIG. 8 and the imaging device is different from a relative positional relationship between the pedestrian in FIG. 9 and the imaging device, and it is finally determined in the disclosure that a motion orientation of the pedestrian in FIG. 8 relative to the traveling direction of the imaging device is the rear and a motion orientation of the pedestrian in FIG. 9 relative to the traveling direction of the imaging device is the right.

In an optional example, the method provided in the embodiment of the disclosure further includes the following operation.

An instruction or early earning prompting information of controlling the body (for example, a vehicle, an aircraft, a ship or a robot) where the imaging device is located, for example, an instruction of increasing the speed per hour, an instruction of reducing the speed per hour, an emergency brake instruction, prompting information of paying attention to a certain bearing or early warning prompting information against collision, is generated according to the obtained motion orientation of the target object relative to the traveling direction of the imaging device. A specific implementation manner for generating the instruction or the early warning prompting information according to the motion orientation of the target object relative to the traveling direction of the imaging device is not limited in the disclosure.

FIG. 10 is a flowchart of a neural network training method according to an embodiment of the disclosure. As shown in FIG. 10, the method of the embodiment includes S1000, S1010 and S1020. S1000, S1010 and S1020 in the disclosure include the following operations.

In S1000, a sample image block including a target object is acquired.

In an optional example, S1000 may be executed by a processor by invoking a corresponding instruction stored in a memory, and may also be executed by a second acquisition module 1300 operated by the processor.

In S1010, apparent orientation detection is performed on the sample image block by means of a first neural network to be trained to obtain an apparent orientation of the target object in the sample image block.

In an optional example, S1010 may be executed by the processor by invoking a corresponding instruction stored in the memory, and may also be executed by a third acquisition module 1310 operated by the processor.

In S1020, supervised learning is performed on the first neural network to be trained by using, as guidance information, a difference between the obtained apparent orientation of the target object and apparent orientation labeling information of the sample image block.

In an optional example, S1020 may be executed by the processor by invoking a corresponding instruction stored in the memory, and may also be executed by a supervised learning module 1320 operated by the processor.

In an optional example, in the disclosure, an image sample may be acquired from a training dataset and the sample image block including the target object in the image sample may be acquired. For example, in the disclosure, the image sample may be provided for a successfully trained neural network configured for target object bounding box detection, and the neural network outputs target object detection result information. In the disclosure, a bounding box (for example, coordinates of two vertexes on a diagonal of the bounding box) of the target object in the image sample may be obtained according to the detection result information, and then segmentation processing may be performed on the image sample by use of an obtained bounding box of the target object, so that the sample image block including the target object may be obtained. Under the condition that the image sample includes multiple target objects (for example, pedestrians), multiple bounding boxes of the target objects may be obtained by use of the neural network configured for target object bounding box detection in the disclosure, so that multiple sample image blocks may be obtained by segmentation processing.

In an optional example, the apparent orientation labeling information includes labeling information of an angle interval to which the apparent orientation belongs or labeling information of an apparent orientation angle.

The information output by the first neural network to be trained includes information representing the angle interval to which the apparent orientation of the target object belongs or information representing an apparent orientation angle of the target object.

The training dataset in the disclosure includes multiple image samples configured to train the first neural network. Under a normal condition, the apparent orientation labeling information of the target object is set in each image sample. For example, each image sample is labeled with the labeling information of the angle interval to which the apparent orientation of the target object belongs. For example, each image sample is labeled with the labeling information of an apparent orientation angle of the target object. The labeling information of the angle interval to which the apparent orientation of the target object belongs may include two angle end values of the angle interval to which the apparent orientation of the target object belongs, and may also include an identifier corresponding to the angle interval to which the apparent orientation of the target object belongs (for example, 1 represents one angle interval and 2 represents another angle interval).

In an optional example, one or more image samples may be read from the training dataset at one time according to a random reading manner or a manner of sequential reading according to an image sample arrangement sequence.

In an optional example, the angle interval of the apparent orientation of the target object includes at least one of:

a front angle interval, a front left angle interval, a left angle interval, a rear left angle interval, a rear angle interval, a rear right angle interval, a right angle interval and a front right angle interval.

The apparent orientation of the target object in the image sample usually belongs to an angle range of 0 degree to 360 degrees. The angle range may be divided into multiple angle intervals in the disclosure, for example, the four angle intervals or eight angle intervals recorded in the abovementioned method implementation. Specific descriptions are made in the abovementioned method implementation and repetitions are omitted herein.

In an optional example, the first neural network to be trained in the disclosure may perform apparent orientation detection and outputs apparent orientation detection result information for each input sample image block. For example, the first neural network may output the angle interval to which the apparent orientation of the target object belongs for each sample image block. For another example, the first neural network may output an angle in the angle interval to which the apparent orientation of the target object belongs for each sample image block.

In an optional example, when training for the first neural network to be trained reaches a predetermined iteration condition, a present training process is ended. The predetermined iteration condition in the disclosure may include that a difference between the information output by the first neural network to be trained and the apparent orientation labeling information of the image sample meets a predetermined difference requirement. Under the condition that the difference meets the predetermined difference requirement, present training of the first neural network to be trained is successfully completed. The predetermined iteration condition in the disclosure may also include that the number of image samples for training the first neural network to be trained reaches a predetermined number requirement. When the number of the used image samples reaches the predetermined number requirement but the difference does not meet the predetermined difference requirement, present training of the first neural network to be trained fails. The successfully trained first neural network may be configured to predict the apparent orientation of the target object in the image.

FIG. 11 is a flowchart of an intelligent vehicle control method according to an embodiment of the disclosure.

As shown in FIG. 11, the method of the embodiment includes S1100, S1110 and S1120. S1100, S1110 and S1120 in the disclosure include the following operations.

In S1100, an apparent orientation of a target object in an image shot by an imaging device is acquired, and a relative positional relationship between the target object in the image and the imaging device in a three-dimensional space is acquired.

In an optional example, S1100 may be executed by a processor by invoking a corresponding instruction stored in a memory, and may also be executed by a first acquisition module 1200 operated by the processor.

In S1110, a motion orientation of the target object relative to a traveling direction of the imaging device is determined according to the apparent orientation of the target object and the relative positional relationship.

In an optional example, S1110 may be executed by the processor by invoking a corresponding instruction stored in the memory, and may also be executed by an orientation determination module 1210 operated by the processor.

In S1120, an instruction for controlling a vehicle where the imaging device is located or early warning prompting information for the vehicle is generated according to the motion orientation of the target object relative to the traveling direction of the imaging device.

In an optional example, S1120 may be executed by the processor by invoking a corresponding instruction stored in the memory, and may also be executed by an intelligent control module 1240 operated by the processor.

In an optional example, an implementation process of S1100 in the disclosure may refer to the descriptions about S100 in FIG. 1. An implementation process of S1110 in the disclosure may refer to the descriptions about S110 in FIG. 1. Repetitions are omitted herein.

In an optional example, in the disclosure, the instruction or early earning prompting information of controlling the vehicle where the imaging device is located, for example, an instruction of increasing the speed per hour, an instruction of reducing the speed per hour, an emergency brake instruction, prompting information of paying attention to a target object in a certain bearing or early warning prompting information against collision, may be generated according to the obtained motion orientation of the target object relative to the traveling direction of the imaging device. A specific implementation manner for generating the instruction or the early warning prompting information according to the motion orientation of the target object relative to the traveling direction of the imaging device is not limited in the disclosure.

An application scenario of the disclosure is shown in FIG. 6. In FIG. 6, a target object B, i.e., a pedestrian B, walks from the left (for example, the far left) of a zebra crossing to the right (for example, the far right) of the zebra crossing, an imaging device is arranged in a vehicle on one side of the zebra crossing, and it is set that the imaging device shoots video frames of the whole process that the pedestrian B walks from the left (for example, the far left) of the zebra crossing to the right (for example, the far right) of the zebra crossing. In the disclosure, when the pedestrian B is on the left (for example, the far left) of the zebra crossing, it may be recognized that an apparent orientation of the pedestrian B in an image is the front right, and it may be learned by calculation that a motion orientation of the pedestrian B is the right. In the disclosure, when the pedestrian B is at a middle position of the zebra crossing, it may be recognized that the apparent orientation of the pedestrian B in the image is the front right, and it may be learned by calculation that the motion orientation of the pedestrian B is the right. In the disclosure, when the pedestrian B is on the right (for example, the far right) of the zebra crossing, it may be recognized that an apparent orientation of the pedestrian B in an image is the rear right, and it may be learned by calculation that a motion orientation of the pedestrian B is the right. It can thus be seen that, under the condition that the apparent orientations of the same pedestrian in different images are different and the relative positional relationship between the target object and the imaging device in the three-dimensional space changes, it may be judged in the disclosure that motion orientations of the same target object with the different apparent orientations in the different images relative to the traveling direction of the vehicle are the same. Therefore, the technical solution provided in the disclosure is favorable for improving the accurate interpretation of the image, favorable for accurately understanding a motion orientation of a target object such as a pedestrian relative to a driving direction of a vehicle and thus favorable for accurately generating an instruction for controlling the vehicle or early warning prompting information for the vehicle, and further favorable for improving the driving safety of the vehicle.

An application scenario of the disclosure is shown in FIG. 8 and FIG. 9. It is set that both FIG. 8 and FIG. 9 show a video frame in a video shot by the imaging device in the vehicle. In the disclosure, it may be recognized that the apparent orientation of the pedestrian in the image shown in FIG. 8 is the front right, and it may be learned by calculation that the motion orientation of the pedestrian is the rear right. In the disclosure, it may be recognized that the apparent orientation of the pedestrian in the image shown in FIG. 9 is the front right, and it may be learned by calculation that the motion orientation of the pedestrian is the right. It can thus be seen that, although the apparent orientations of different pedestrians in different images are the same, relative positional relationships of different pedestrians and the imaging device in the three-dimensional space are different, and it may be judged in the disclosure that motion orientations of different pedestrians with the same apparent orientation in the different images relative to the traveling direction of the vehicle are different. Therefore, the technical solution provided in the disclosure is favorable for improving the accurate interpretation of the image, favorable for accurately understanding a motion orientation of a target object such as a pedestrian relative to a driving direction of a vehicle and thus favorable for accurately generating an instruction for controlling the vehicle or early warning prompting information for the vehicle, and further favorable for improving the driving safety of the vehicle.

Those of ordinary skill in the art should know that all or part of the operations of the method embodiment may be implemented by related hardware instructed with a program, the program may be stored in a computer-readable storage medium, and the program is executed to execute the operations of the method embodiment. The storage medium includes: various media capable of storing program codes such as a Read-Only Memory (ROM), a Random Access Memory (RAM), a magnetic disk or a compact disc.

FIG. 12 is a structure diagram of a device for predicting a motion orientation of a target object according to an embodiment of the disclosure. As shown in FIG. 12, the device of the embodiment mainly includes a first acquisition module 1200 and an orientation determination module 1210. In an optional example, the device may further include at least one of an image block generation module 1220, a neural network training device 1230 and an intelligent control module 1240.

The first acquisition module 1200 is mainly configured to acquire an apparent orientation of a target object in an image shot by an imaging device and acquire a relative positional relationship between the target object in the image and the imaging device in a three-dimensional space. For example, the first acquisition module 1200 provides an image block including the target object in the image to a first neural network for performing apparent orientation detection to obtain the apparent orientation of the target object in the image.

The orientation determination module 1210 is mainly configured to determine a motion orientation of the target object relative to a traveling direction of the imaging device according to the apparent orientation of the target object and the relative positional relationship.

The image block generation module 1220 is mainly configured to: provide the image to a second neural network configured for target object bounding box detection to obtain a bounding box of the target object in the image; and perform segmentation processing on the image according to an obtained bounding box of the target object to obtain an image block including the target object.

The neural network training device 1230 is mainly configured to train a first neural network to be trained by use of a training image set including labeling information of the apparent orientation of the target object.

The intelligent control module 1240 is mainly configured to generate an instruction for controlling a body where the imaging device is located or early warning prompting information for the body according to the motion orientation of the target object relative to the traveling direction of the imaging device, the body being a vehicle, an aircraft, a ship or a robot, etc.

In an optional example, the imaging device in the disclosure may be an imaging device arranged in the body, and the traveling direction of the imaging device is a traveling direction of the body. The body may include a vehicle, an aircraft, a ship or a robot. The image in the disclosure may include a video frame extracted from a video shot by the imaging device by means of frame extraction. The target object in the disclosure may include a pedestrian, an animal, a non-motor vehicle or an obstacle.

In an optional example, the first acquisition module in the disclosure may include a first sub-module, a second sub-module and a third sub-module (not shown in the figure).

The first sub-module is mainly configured to transform a position of the target object in the image to a position of the target object in the three-dimensional space according to a projection transformation matrix.

The second sub-module is mainly configured to determine a position of the imaging device in the three-dimensional space. For example, the second sub-module transforms a first point and second point on a first line in the image and a third point and fourth point on a second line in the image to the three-dimensional space according to the projection transformation matrix respectively. The second sub-module determines an intersection point of a line formed by the first point and second point in the three-dimensional space and a line formed by the third point and fourth point in the three-dimensional space as the position of the imaging device in the three-dimensional space. The first line and second line in the image are parallel to each other and perpendicular to a horizontal direction respectively. The projection transformation matrix in the disclosure may include a projection transformation matrix formed by calibrating the imaging device in advance. The projection transformation matrix in the disclosure may also include a projection transformation matrix obtained by solving a homography matrix function according to coordinates, in the image, of multiple feature points in the image. The feature point in the disclosure may include a point on a road planning marking.

The third sub-module is mainly configured to connect the positions of the target object and imaging device in the three-dimensional space and determine an included angle between a line connecting the positions and a normal of a motion orientation of the imaging device.

In an optional example, the training device 1230 for the first neural network in the disclosure mainly includes a second acquisition module 1300, a third acquisition module 1310 and a supervised learning module 1320.

The second acquisition module 1300 is mainly configured to acquire a sample image block including the target object.

The third acquisition module 1310 is mainly configured to perform apparent orientation detection on the sample image block by means of the first neural network to be trained to obtain an apparent orientation of the target object in the sample image block.

The supervised learning module 1320 is mainly configured to perform supervised learning on the first neural network to be trained by using, as guidance information, a difference between the obtained apparent orientation of the target object and apparent orientation labeling information of the sample image block.

In an optional example, the apparent orientation labeling information in the disclosure may include labeling information of an angle interval to which the apparent orientation belongs; or the apparent orientation labeling information may include labeling information of an apparent orientation angle. Information output by the first neural network to be trained may include information representing the angle interval to which the apparent orientation of the target object belongs; or, the information output by the first neural network to be trained may include information representing an apparent orientation angle of the target object.

In an optional example, the angle interval in the disclosure includes at least one of a front angle interval, a front left angle interval, a left angle interval, a rear left angle interval, a rear angle interval, a rear right angle interval, a right angle interval and a front right angle interval. For example, the angle interval in the disclosure includes the front angle interval, the left angle interval, the rear angle interval and the right angle interval. For another example, the angle interval in the disclosure includes the front angle interval, the front left angle interval, the left angle interval, the rear left angle interval, the rear angle interval, the rear right angle interval, the right angle interval and the front right angle interval.

In an optional example, any angle in the angle interval, output by the first neural network, to which the apparent orientation of the target object belongs is determined as the apparent orientation of the target object.

In an optional example, a center angle of the angle interval, output by the first neural network, to which the apparent orientation of the target object belongs is determined as the apparent orientation of the target object.

In an optional example, in the disclosure, the relative positional relationship between the target object in the image and the imaging device in the three-dimensional space includes a bearing of the target object in the three-dimensional space relative to the imaging device in the three-dimensional space.

In an optional example, in the disclosure, the bearing of the target object in the three-dimensional space relative to the imaging device in the three-dimensional space includes the included angle between the line connecting the position of the target object in the three-dimensional space and the position of the imaging device in the three-dimensional space and the normal of the motion orientation of the imaging device.

The operations executed by the first acquisition module 1200 and the orientation determination module 1210 and the technical effects that may be achieved may refer to the descriptions about S100 and S110 in FIG. 1 in the abovementioned method implementation. Repetitions are omitted herein.

FIG. 13 is a structure diagram of a neural network training device according to an embodiment of the disclosure. As shown in FIG. 13, the device of the embodiment mainly includes a second acquisition module 1300, a third acquisition module 1310 and a supervised learning module 1320.

The second acquisition module 1300 is mainly configured to acquire a sample image block including a target object.

The third acquisition module 1310 is mainly configured to perform apparent orientation detection on the sample image block by means of a first neural network to be trained to obtain an apparent orientation of the target object in the sample image block.

The supervised learning module 1320 is mainly configured to perform supervised learning on the first neural network to be trained by using, as guidance information, a difference between the obtained apparent orientation of the target object and apparent orientation labeling information of the sample image block.

In an optional example, the apparent orientation labeling information in the disclosure may include labeling information of an angle interval to which the apparent orientation belongs; or the apparent orientation labeling information may include labeling information of an apparent orientation angle. Information output by the first neural network to be trained may include information representing the angle interval to which the apparent orientation of the target object belongs; or, the information output by the first neural network to be trained may include information representing an apparent orientation angle of the target object.

In an optional example, the angle interval in the disclosure includes at least one of a front angle interval, a front left angle interval, a left angle interval, a rear left angle interval, a rear angle interval, a rear right angle interval, a right angle interval and a front right angle interval. For example, the angle interval in the disclosure includes the front angle interval, the left angle interval, the rear angle interval and the right angle interval. For another example, the angle interval in the disclosure includes the front angle interval, the front left angle interval, the left angle interval, the rear left angle interval, the rear angle interval, the rear right angle interval, the right angle interval and the front right angle interval.

The operations executed by the second acquisition module 1300, the third acquisition module 1310 and the supervised learning module 1320 and the technical effects that may be achieved may refer to the descriptions about S1000, S1010 and S1020 in FIG. 10 in the abovementioned method implementation. Repetitions are omitted herein.

FIG. 14 is a structure diagram of an intelligent vehicle control device according to an embodiment of the disclosure. The device in FIG. 14 mainly includes a first acquisition module 1200, an orientation determination module 1210 and an intelligent control module 1240. In an optional example, the device may further include an image block generation module 1220.

The first acquisition module 1200 is mainly configured to acquire an apparent orientation of a target object in an image shot by an imaging device and acquire a relative positional relationship between the target object in the image and the imaging device in a three-dimensional space. For example, the first acquisition module 1200 provides an image block including the target object in the image to a first neural network for performing apparent orientation detection to obtain the apparent orientation of the target object in the image.

The orientation determination module 1210 is mainly configured to determine a motion orientation of the target object relative to a traveling direction of the imaging device according to the apparent orientation of the target object and the relative positional relationship.

The image block generation module 1220 is mainly configured to: provide the image to a second neural network configured for target object bounding box detection to obtain a bounding box of the target object in the image; and perform segmentation processing on the image according to an obtained bounding box of the target object to obtain an image block including the target object.

The intelligent control module 1240 is mainly configured to generate an instruction for controlling a body where the imaging device is located or early warning prompting information for the body according to the motion orientation of the target object relative to the traveling direction of the imaging device, the body being a vehicle, an aircraft, a ship or a robot, etc.

The operations executed by the first acquisition module 1200, the orientation determination module 1210, the image block generation module 1220 and the intelligent control module 1240 and the technical effects that may be achieved may refer to the related descriptions in FIG. 1 and FIG. 11 in the abovementioned method implementations. Repetitions are omitted herein.

FIG. 15 illustrates an exemplary device 1500 suitable for implementing the disclosure. The device 1500 may be a control system/electronic system configured in a vehicle, a mobile terminal (for example, a smart mobile phone), a PC (for example, a desktop computer or a notebook computer), a tablet computer and a server, etc. In FIG. 15, the device 1500 includes one or more processors, a communication unit and the like. The one or more processors may be one or more Central Processing Units (CPUs) 1501 and/or one or more Graphics Processing Units (GPUs) 1513 configured to predicting a motion orientation of a target object by use of a neural network, etc. The processor may execute various proper actions and processing according to an executable instruction stored in a ROM 1502 or an executable instruction loaded from a storage part 1508 to a RAM 1503. The communication unit 1512 may include, but not limited to, a network card, and the network card may include, but not limited to, an Infiniband (IB) network card. The processor may communicate with the ROM 1502 and/or the RAM 1530 to execute the executable instruction, is connected with the communication unit 1512 through a bus 1504 and communicates with another target device through the communication unit 1512, thereby completing the corresponding operations in the disclosure.

The operation executed according to each instruction may refer to the related descriptions in the method embodiment and will not be described herein in detail. In addition, various programs and data required by the operations of the device may further be stored in the RAM 1503. The CPU 1501, the ROM 1502 and the RAM 1503 are connected with one another through a bus 1504. Under the condition that there is the RAM 1503, the ROM 1502 is an optional module. The RAM 1503 stores the executable instruction, or the executable instruction is written in the ROM 1502 during running, and with the executable instruction, the CPU 1501 executes the corresponding operations of the object segmentation method. An Input/Output (I/O) interface 1505 is also connected to the bus 1504. The communication unit 1512 may be integrated, and may also be arranged to include multiple sub-modules (for example, multiple IB network cards) connected with the bus respectively.

The following components are connected to the I/O interface 1505: an input part 1506 including a keyboard, a mouse and the like; an output part 1507 including a Cathode-Ray Tube (CRT), a Liquid Crystal Display (LCD), a speaker and the like; the storage part 1508 including a hard disk and the like; and a communication part 1509 including a Local Area Network (LAN) card and a network interface card of a modem and the like. The communication part 1509 executes communication processing by means of a network such as the Internet. A driver 1510 is also connected to the I/O interface 1505 as required. A removable medium 1511, for example, a magnetic disk, an optical disk, a magneto-optical disk and a semiconductor memory, is installed on the driver 1510 as required such that a computer program read therefrom is installed in the storage part 1508 as required.

It is to be particularly noted that the architecture shown in FIG. 15 is only an optional implementation and the number and types of the components in FIG. 15 may be selected, deleted, added or replaced according to a practical requirement in a practice process. In terms of arrangement of different functional components, an implementation manner such as separate arrangement or integrated arrangement may also be adopted. For example, the GPU and the CPU may be separately arranged. For another example, the GPU may be integrated to the CPU, and the communication unit may be separately arranged and may also be integrated to the CPU or the GPU. All these alternative implementations shall fall within the scope of protection of the disclosure.

Particularly, according to the implementation of the disclosure, the process described below with reference to the flowchart may be implemented as a computer software program. For example, the implementation of the disclosure includes a computer program product, which includes a computer program physically included in a machine-readable medium, the computer program includes a program code configured to execute the operations shown in the flowchart, and the program code may include an instruction corresponding to the operations in the method provided in the disclosure.

In this implementation, the computer program may be downloaded from the network and installed via the communication part 1509 and/or installed from the removable medium 1511. The computer program is executed by the CPU 1501 to execute the instruction for implementing the corresponding operations in the disclosure.

In one or more optional implementations, the embodiment of the disclosure also provides a computer program product, which is configured to store a computer-readable instruction, the instruction being executed to enable a computer to execute the method for predicting the motion orientation of the target object, or the neural network training method or the intelligent vehicle control method in any abovementioned embodiment.

The computer program product may specifically be implemented through hardware, software or a combination thereof. In an optional example, the computer program product is specifically embodied as a computer storage medium. In another optional example, the computer program product is specifically embodied as a software product, for example, a Software Development Kit (SDK).

In one or more optional implementations, the embodiments of the disclosure also provide another method for predicting a motion orientation of a target object, neural network training method and intelligent vehicle control method, as well as corresponding devices, an electronic device, a computer storage medium, a computer program and a computer program product. The method includes that: a first device sends an instruction of predicting a motion orientation of a target object or a neural network training instruction or an intelligent vehicle control instruction to a second device, the instruction enabling the second device to execute the method for predicting the motion orientation of the target object or neural network training method or intelligent vehicle control method in any abovementioned possible embodiment; and the first device receives a prediction result of the motion orientation of the target object or a neural network training result or an intelligent vehicle control result from the second device, In some embodiments, the instruction of predicting the motion orientation of the target object or the neural network training instruction or the intelligent vehicle control instruction may include a invoking instruction, the first device may instruct the second device in a invoking manner to execute an operation of predicting the motion orientation of the target object or a neural network training operation or an intelligent vehicle control operation, and the second device, responsive to receiving the invoking instruction, may execute the operations and/or flows in any embodiment of the method for predicting the motion orientation of the target object or the neural network training method or the intelligent vehicle control method.

It is to be understood that terms "first", "second" and the like in the embodiment of the disclosure are only adopted for distinguishing and should not be understood as limits to the embodiment of the disclosure. It is also to be understood that, in the disclosure, "multiple" may refer to two or more than two and "at least one" may refer to one, two or more than two. It is also to be understood that, for any component, data or structure mentioned in the disclosure, the number thereof can be understood to be one or multiple if there is no specific limits or opposite revelations are presented in the context. It is also to be understood that, in the disclosure, the descriptions about each embodiment are made with emphasis on differences between each embodiment and the same or similar parts may refer to each other and will not be elaborated for simplicity.

Each embodiment in the specification is described progressively. Descriptions made in each embodiment focus on differences with the other embodiments and the same or similar parts in each embodiment refer to the other embodiments. The system embodiment substantially corresponds to the method embodiment and thus is described relatively simply, and related parts refer to part of the descriptions about the method embodiment.

The method and device of the disclosure may be implemented in various manners. For example, the method and device of the disclosure may be implemented through software, hardware, firmware or any combination of the software, the hardware and the firmware. The sequence of the operations of the method is only for description, and the operations of the method of the disclosure are not limited to the sequence specifically described above, unless otherwise specified in another manner. In addition, in some embodiments, the disclosure may also be implemented as a program recorded in a recording medium, and the program includes a machine-readable instruction configured to implement the method according to the disclosure. Therefore, the disclosure further cover the recording medium storing the program configured to execute the method according to the disclosure.

The descriptions of the disclosure are made for examples and description and are not exhaustive or intended to limit the disclosure to the disclosed form. Many modifications and variations are apparent to those of ordinary skill in the art. The embodiments are selected and described to describe the principle and practical application of the disclosure better and enable those of ordinary skill in the art to understand the disclosure and further design various embodiments suitable for specific purposes and with various modifications.

The invention claimed is:

1. A computer-implemented method for predicting a motion orientation of a target object, the computer-implemented method comprising:
   acquiring an apparent orientation of a target object in an image shot by an imaging device, and acquiring a relative positional relationship between the target object in the image and the imaging device in a three-dimensional space; and
   determining a motion orientation of the target object relative to a traveling direction of the imaging device according to the apparent orientation of the target object and the relative positional relationship, the motion orientation of the target object relative to the traveling direction of the imaging device being used to control a body where the imaging device is located, or perform early warning prompting for the body,
   wherein acquiring the apparent orientation of the target object in the image shot by the imaging device comprises:
      providing an image block comprising the target object in the image to a first neural network for performing apparent orientation detection to obtain the apparent orientation of the target object in the image.

2. The computer-implemented method of claim 1, wherein the imaging device comprises an imaging device arranged in the body, the traveling direction of the imaging device is a traveling direction of the body, and the body comprises a moving body, and the image comprises a video frame extracted from a video shot by the imaging device by means of frame extraction, and the target object comprises a pedestrian, an animal, a non-motor vehicle or an obstacle.

3. The computer-implemented method of claim 1, wherein the image block is generated by:
   providing the image to a second neural network configured for target object bounding box detection to obtain a bounding box of the target object in the image; and
   performing segmentation processing on the image according to the obtained bounding box of the target object to obtain the image block comprising the target object.

4. The computer-implemented method of claim 1, wherein the first neural network is trained with a training image set comprising labeling information of the apparent orientation of the target object in advance,
   wherein a training process of the first neural network comprises:
      acquiring a sample image block comprising the target object;
      performing apparent orientation detection on the sample image block by means of the first neural network to be trained to obtain an apparent orientation of the target object in the sample image block; and
      performing supervised learning on the first neural network to be trained by using, as guidance information, a difference between the obtained apparent orientation of the target object and apparent orientation labeling information of the sample image block.

5. The computer-implemented method of claim 4, wherein the apparent orientation labeling information comprises labeling information of an angle interval to which the apparent orientation belongs or labeling information of an apparent orientation angle; and
   information output by the first neural network to be trained comprises information representing the angle interval to which the apparent orientation of the target object belongs or information representing an apparent orientation angle of the target object.

6. The computer-implemented method of claim 5, wherein the angle interval comprises at least one of:
a front angle interval, a front left angle interval, a left angle interval, a rear left angle interval, a rear angle interval, a rear right angle interval, a right angle interval or a front right angle interval.

7. The computer-implemented method of claim 1, wherein
any angle in an angle interval, output by the first neural network, to which the apparent orientation of the target object belongs is determined as the apparent orientation of the target object; or
a center angle of the angle interval, output by the first neural network, to which the apparent orientation of the target object belongs is determined as the apparent orientation of the target object.

8. The computer-implemented method of claim 1, wherein acquiring the relative positional relationship between the target object in the image and the imaging device in the three-dimensional space comprises:
transforming a position of the target object in the image to a position of the target object in the three-dimensional space according to a projection transformation matrix;
determining a position of the imaging device in the three-dimensional space; and
connecting the positions of the target object and the imaging device in the three-dimensional space, and determining an included angle between a line connecting the positions and a normal of a motion orientation of the imaging device.

9. The computer-implemented method of claim 8, wherein determining the position of the imaging device in the three-dimensional space comprises:
transforming a first point and second point on a first line in the image and a third point and fourth point on a second line in the image to the three-dimensional space according to the projection transformation matrix respectively; and
determining, an intersection point of a line formed by the first point and the second point in the three-dimensional space and a line formed by the third point and the fourth point in the three-dimensional space, as the position of the imaging device in the three-dimensional space,
wherein the first line and second line in the image are parallel to each other and perpendicular to a horizontal direction respectively.

10. The computer-implemented method of claim 8, wherein the projection transformation matrix comprises a projection transformation matrix formed by calibrating the imaging device in advance; or
the projection transformation matrix comprises a projection transformation matrix obtained by solving a homography matrix function according to coordinates, in the image, of multiple feature points in the image, wherein the feature points are points on a road planning marking.

11. The computer-implemented method of claim 8, wherein determining the motion orientation of the target object relative to the traveling direction of the imaging device according to the apparent orientation of the target object and the relative positional relationship comprises:
determining the motion orientation of the target object relative to the traveling direction of the imaging device according to the apparent orientation of the target object and a bearing of the target object relative to the imaging device in the three-dimensional space.

12. The computer-implemented method of claim 1, further comprising:
generating an instruction for controlling the body where the imaging device is located or early warning prompting information for the body according to the motion orientation of the target object relative to the traveling direction of the imaging device, the body comprising a moving body.

13. A computer-implemented intelligent vehicle control method, comprising:
acquiring an apparent orientation of a target object in an image shot by an imaging device, and acquiring a relative positional relationship between the target object in the image and the imaging device in a three-dimensional space;
determining a motion orientation of the target object relative to a traveling direction of the imaging device according to the apparent orientation of the target object and the relative positional relationship; and
generating an instruction for controlling a vehicle where the imaging device is located or early warning prompting information for the vehicle according to the motion orientation of the target object relative to the traveling direction of the imaging device, the motion orientation of the target object relative to the traveling direction of the imaging device being used to control a body where the imaging device is located, or perform early warning prompting for the body,
wherein acquiring the apparent orientation of the target object in the image shot by the imaging device comprises:
providing an image block comprising the target object in the image to a first neural network for performing apparent orientation detection to obtain the apparent orientation of the target object in the image.

14. A device for predicting a motion orientation of a target object, comprising:
a memory storing processor-executable instructions; and
a processor arranged to execute the stored processor-executable instructions to perform operations of:
acquiring an apparent orientation of a target object in an image shot by an imaging device and acquiring a relative positional relationship between the target object in the image and the imaging device in a three-dimensional space; and
determining a motion orientation of the target object relative to a traveling direction of the imaging device according to the apparent orientation of the target object and the relative positional relationship, the motion orientation of the target object relative to the traveling direction of the imaging device being used to control a body where the imaging device is located, or perform early warning prompting for the body,
wherein acquiring the apparent orientation of the target object in the image shot by the imaging device comprises:
providing an image block comprising the target object in the image to a first neural network for performing apparent orientation detection to obtain the apparent orientation of the target object in the image.

15. The device of claim 14, wherein the image block is generated by:
providing the image to a second neural network configured for target object bounding box detection to obtain a bounding box of the target object in the image; and performing segmentation processing on the image according to the obtained bounding box of the target object to obtain the image block comprising the target object.

16. The device of claim 14, wherein the first neural network is trained with a training image set comprising labeling information of the apparent orientation of the target object in advance, wherein a training process of the first neural network comprises:
- acquiring a sample image block comprising the target object;
- performing apparent orientation detection on the sample image block by means of the first neural network to be trained to obtain an apparent orientation of the target object in the sample image block; and
- performing supervised learning on the first neural network to be trained by using, as guidance information, a difference between the obtained apparent orientation of the target object and apparent orientation labeling information of the sample image block.

17. The device of claim 16, wherein the apparent orientation labeling information comprises labeling information of an angle interval to which the apparent orientation belongs or labeling information of an apparent orientation angle; and information output by the first neural network to be trained comprises information representing the angle interval to which the apparent orientation of the target object belongs or information representing an apparent orientation angle of the target object.

18. A non-transitory computer-readable storage medium having stored thereon a computer program that, when executed by a processor, causes the processor to implement the method of claim 1.

* * * * *